G. JAEGER

WATER TANK FOR CONCRETE MIXERS

Jan. 6, 1931. Re. 17,924

Original Filed May 19, 1928, 2 Sheets-Sheet 1

Inventor
GEBHARD JAEGER

By Finnegan & Finnegan
his Attorneys

G. JAEGER

Jan. 6, 1931.

WATER TANK FOR CONCRETE MIXERS

Original Filed May 19, 1928

Re. 17,924

2 Sheets-Sheet 2

Inventor

GEBHARD JAEGER

By

Finnegan Finnegan his Attorneys

Reissued Jan. 6, 1931 Re. 17,924

UNITED STATES PATENT OFFICE

GEBHARD JAEGER, OF COLUMBUS, OHIO

WATER TANK FOR CONCRETE MIXERS

Original No. 1,710,876, dated April 30, 1929, Serial No. 279,169, filed May 19, 1928. Application for reissue filed November 1, 1929. Serial No. 404,185.

This invention relates to water supplying means for concrete mixers, and its object is to provide improved means whereby the water is supplied to the mixing drum in predetermined quantity for each batch according to the specification for each particular job the supply being automatically effected by the ordinary operation of the machine in supplying the dry materials. In the ordinary operation of the machine a clutch shaft is operated to elevate the dry material charging bucket to drum charging position and according to the invention, as herein shown, the operation of the clutch shaft to raise the bucket also effects the supply of water before the charging bucket reaches the position for discharging its contents into the drum.

The invention is embodied in the example herein shown and described.

In the accompanying drawings—

Figure 1:
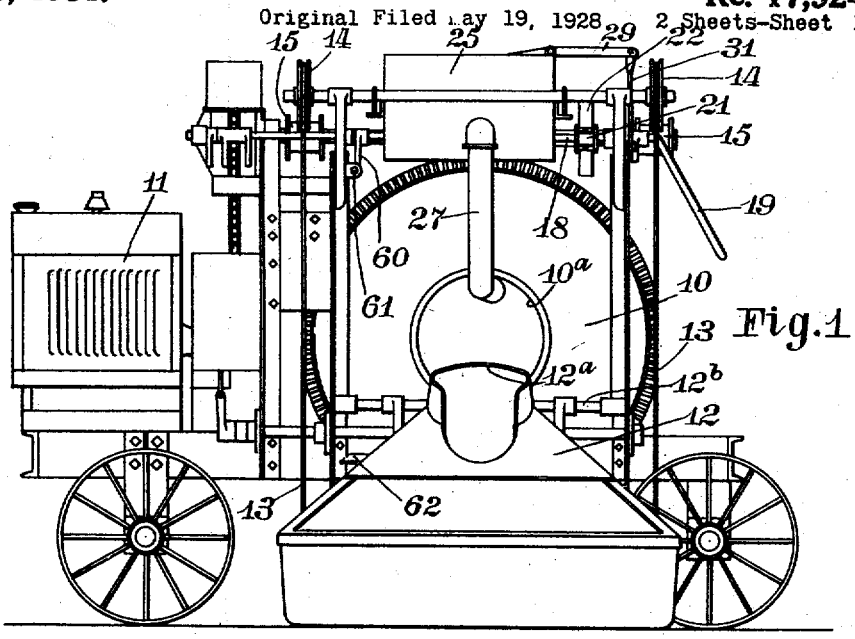
Figure 1 is a view in elevation looking at that side of the mixing machine having the drum charging bucket.
Figure 2:
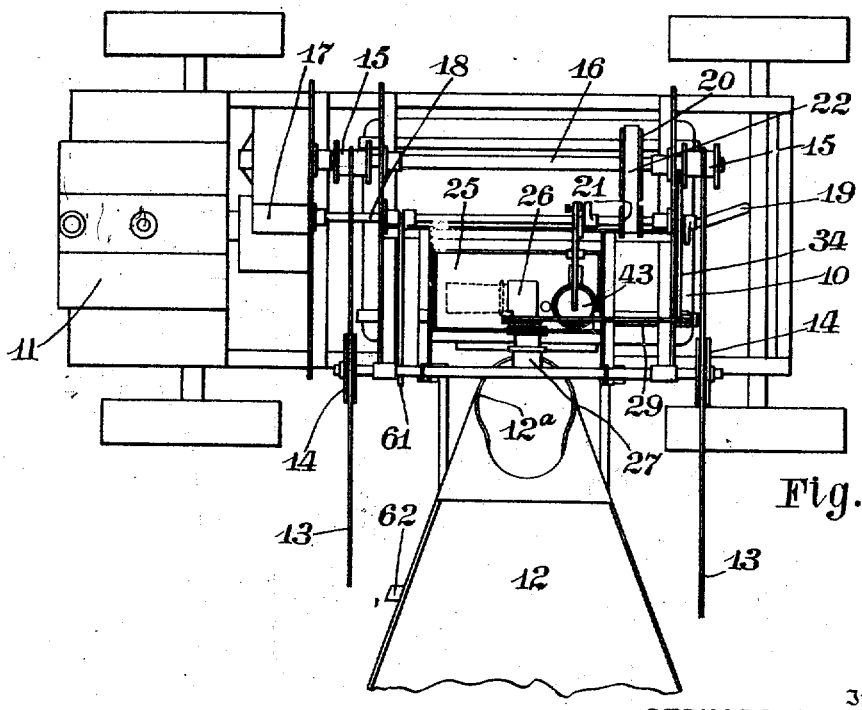
Fig. 2 is a top plan view, a portion of the bucket being broken off.
Figure 3:
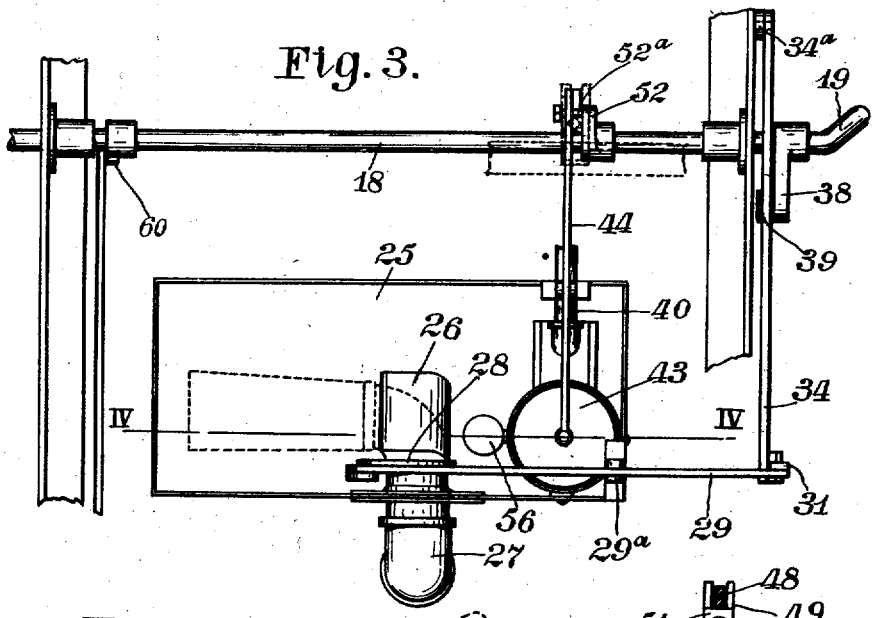
Fig. 3 is a plan view on a larger scale of the water tank and operating parts employed in connection therewith.

In the views 10 designates the mixing drum that, in the example shown, is of the non-tilting variety and has its charging opening at $10^a$. Said drum is mounted on a suitable wheeled truck that carries an appropriate frame. The usual engine for rotating the drum is contained in the hood at 11, power from said engine also operating the charging bucket. The charging bucket is designated 12, it having a discharging spout at $12^a$ and being pivoted to the frame on shaft $12^b$ so that when swung upward the contents thereof will flow through the spout $12^c$ and into the mixing drum through the opening $10^a$. The means for raising and lowering the charging bucket consists of a pair of cables 13, 13, each connected at one end with a side of the bucket, said cables guided by a pair of sheaves 14, 14, and having their other ends connected with a pair of spools 15, 15, on a power operated shaft 16. Said shaft is operated at will through the intervention of a clutch device as usual in such machines.

Said clutch device is contained in a housing at 17 and is controlled by a rock shaft 18 having a handle 19 extending to within easy reach of the attendant.

To raise the bucket to charging position the handle 19 is drawn toward the observer in Fig. 1 thereby operatively engaging the clutch in housing 17 with the shaft 16 and causing the spools 15, 15, to wind up said cables and elevate the charging bucket.

On the power operated shaft 16 is a brake wheel 20; and on the clutch operating shaft 18 is an eccentric 21; and around said brake wheel and the eccentric is a brake band 22 that can be tightened or loosened by rocking the clutch operating shaft 18. The charging bucket is lowered from charging position by gravity upon the release of the clutch by the operation of the shaft 18. The eccentric 21 is so placed that upon the release of the clutch it functions to tighten the brake band 22 to obtain the braking effect desired, this being controlled at will by the attendant and normally so as to avoid undue rapid precipitation of the bucket to the ground position.

The foregoing parts and operations are well known in mixers now in common use and need no further description, they being recited for the purpose of facilitating an understanding of the present invention which as before indicated resides in an improved means cooperating with such a mechanism for automatically supplying to the drum the water ingredient needed for the concrete mixture.

The water tank, which is designated 25 is supported in the frame above the mixing drum. Pivoted within the tank near its bottom is an outlet conductor 26 the axis of which is also hollow and is connected with a discharge conductor 27 at the exterior of the tank, said conductor having its discharge opening extended into the opening 10[a] of the mixing drum so that upon the depression of the outlet end of the pivoted conductor into the body of water in the tank the water flows from the tank into the mixing drum.

Figure 8:
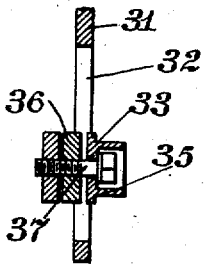
Fig. 8 is a detail in vertical section on the line VIII Fig. 6.

The rotated part of the pivoted intake has a crank arm 28 and the outlet is actuated by means of a lever 29 fulcrumed on the tank at 29[a], one end of said lever being connected with said crank arm. The outer arm of the lever 29 has attached to it a strong spring 30 tending to hold the outlet in elevated position with its inlet end above the level of the water supply. The extremity of the outer portion of the lever 29 has pivoted to it a dependent arm 31 the lower portion of which is provided with a slot 32; and connected with said slotted portion by means of an adjustable slide 33 is the throw arm 34 pivoted at 34[a] on the frame. The slide 33 is held in adjusted position by suitable means including clamping members 35 and 36, each provided with a rib fitting in the slot and a bolt 37 threading into part 36 (see Fig. 8). The edge of the dependent arm is provided with a scale by which the adjustment of the arm 33 can be determined to limit the movement of the throw arm 33, and therefore the depth of submergence of the inlet of the pivoted outlet and the quantity of water to be removed. The quantity of water removed is determined by the depth to which the pivoted outlet is thrown.

Figure 4:
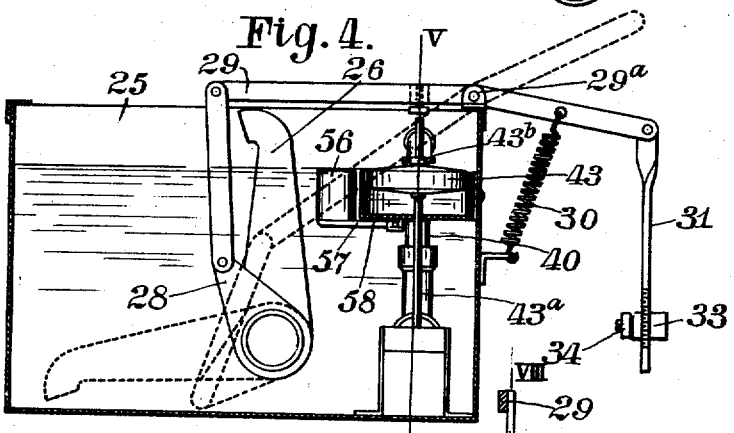
Fig. 4 is a section on the line IV—IV Fig. 3.
Figure 7:
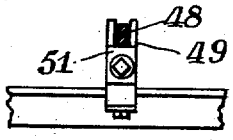
Fig. 7 is a sectional view on the line VII—VII Fig. 5 with the spring omitted.

The shank of the handle 19 is provided with a crank arm 38 the end of which has an anti-friction roller 39 swinging below the throw arm 33, so that when said handle is swung forward to throw in the clutch to raise the bucket the anti-friction roller lifts said throw arm 34 depresses the outlet conductor 26 to the level predetermined as aforesaid, one of which is shown by broken lines in Fig. 4. When said member is so depressed water flows therethrough from the tank into the mixing drum in the quantity predetermined while the bucket is being raised to supply the mixing drum with the solid materials.

Water is resupplied to the tank in a quantity equal to that removed by means of a pipe 40 (see Fig. 5) said pipe containing a valve 41 connected with toggle 42 actuated by a float 43 to close the valve. The float slides on the stem 43[a] that is provided with a stop 43[b], said stem projecting upward beyond the float so as to be struck by a tapper on one end of a lever 44 fulcrumed at 44[a] on an upper edge of the tank. The other end of said lever 44 has pivoted to it a depending arm 46 that is slidingly supported by means of a cross pin 47 in a slot 48 in a bracket 49 secured to the frame. A spring 50 attached to the bracket 49 and the arm 46 tends to draw that arm toward a stop 51 adjustably secured to the bracket.

Figure 5:
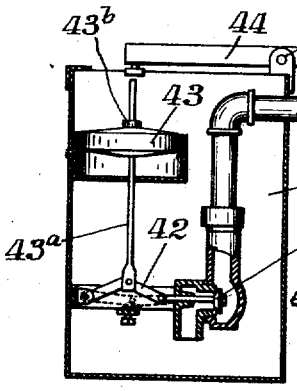
Fig. 5 is a section on the line V—V Fig. 4 with some parts in full.
Figure 6:
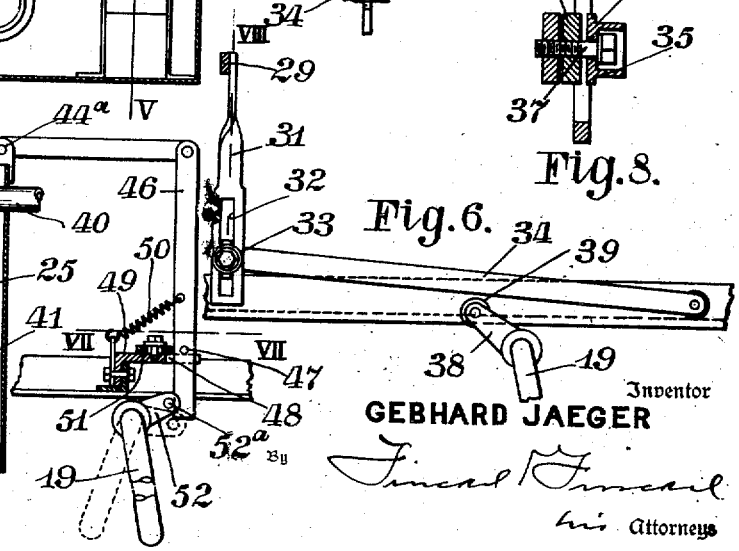
Fig. 6 is a detail looking toward the right hand end of Fig. 3 with parts broken out and in section.

The clutch shaft 18 is provided with a crank arm 52 having thereon a lateral pin 52[a] that, when the clutch shaft is rocked forward to cause the raising of the bucket, rides downward on the forward edge of the lower end of the depending arm 46 pushing it rearward until the lower end of said rod can be drawn forward by the spring 50 to stand over the pin 52[a] as shown by broken lines Fig. 5.

The operation of the clutch shaft 18 to cause the elevation of the bucket sets the pin 52[a] in the position just described so that upon a reverse rocking of said clutch shaft the pin 52[a] is removed from under the lower end of the rod 46, but in this movement that rod is raised to cause the tapper thereon to strike the stem 43[a] and cause the opening of the valve in the water supply pipe. In the down position of the toggle arms operating the valve of the supply pipe the pivotal connection of the upright stem is slightly below a line joining the centers of the opposite pivots so as to prevent an accidental closing of the supply pipe valve 41. The supply pipe valve 41 is drawn to closed position only when the float 43 rises and strikes a stop 43[b] on the stem 43[a].

The clutch operating shaft 18 has attached to it a downwardly standing crank 60 to which is attached one end of a rod 61 the other end thereof reaching to a point where it can be struck by a lug 62 on the loader bucket 12 when that bucket is raised to discharging position and rock the shaft 18 to its normal or primary position. An effect of this operation is to open automatically the supply pipe for resupplying the tank to the extent discharged and permitted by the closing of the valve in said pipe by the rising float 43.

A supplemental float 56 is provided, on an arm 57 which carries a valve 58 to open and close a port or hole in the bottom of the chamber containing the main float 43, said hole permitting the rapid discharge of the water from said chamber when the water has sufficiently lowered in the main tank. The supplemental valve closes the port in the main float chamber before that chamber is full and permits a rapid filling of the chamber over the top and therefore a quick action of the float 43 to close the valve of the supply pipe.

The forms of the parts can be changed without departing from the gist of the invention as claimed.

What I claim is:

1. In a concrete mixer having a mixing drum, a loader bucket, a power operated shaft for operating the bucket and a clutch means for controlling the same, a tank for receiving water, a conductor for removing water from said tank and conveying the same to the mixing drum, said conductor including a swinging part adapted to be depressed into the body of the water in the tank by the actuation of the clutch means to operate the loader bucket.

2. In a concrete mixer having a mixing drum, a loader bucket, a power operated shaft for operating the bucket and a clutch means for controlling the same, a tank for receiving water, a conductor for removing water from said tank and conveying the same to the mixing drum, said conductor including a swinging part adapted to be depressed into the body of the water in the tank by the actuation of the clutch means to operate the loader bucket and means for varying the depth of the depression of said swinging part of the conductor.

3. In a concrete mixer having a mixing drum, a loader bucket, a power operated shaft for operating the bucket and a clutch means for controlling the same, a tank for receiving water, a conductor for removing water from said tank and conveying the same to the mixing drum, said conductor including a swinging part adapted to be depressed into the body of the water in the tank by the actuation of the clutch means to operate the loader bucket, a water supply means for the tank, a valve actuated by a float to close the water supply, and means actuated by the loader bucket to actuate the clutch control to open said water supply valve.

4. In a concrete mixer having a mixing drum, a loader bucket, a power operated shaft for operating the bucket and a clutch means for controlling the same, a tank for receiving water, and a conductor for removing water from said tank and conveying the same to the mixing drum, said conductor including a swinging part adapted to be depressed into the body of the water in the tank by the actuation of the clutch means to operate the loader bucket, a water supply means for the tank, a valve actuated by a float to close the water supply, and means actuated by the loader bucket to actuate the clutch control means to disconnect the clutch from the power operated shaft and open said water supply valve.

5. In a concrete mixer having a mixing drum, a loader bucket, a power operated shaft for operating the bucket and a clutch means for controlling the same, a tank for receiving water, a water supply conductor thereto, a conductor for removing water from said tank and conveying the same to the mixing drum, a valve for the supply conductor and a float for actuating the same to close the water supply, a supplemental chamber in which said float operates, said chamber having a drain port, a valve for opening and closing said port and a supplemental float operating said valve.

6. In a concrete mixer having a mixing drum, a loader bucket, a power operated shaft for operating the bucket and a clutch means for controlling the same, a tank for receiving water, a water supply conductor thereto, a conductor for removing water from said tank and conveying the same to the mixing drum, a valve for the water supply conductor and a float for actuating the valve to close the water supply, and a tappet actuated by the clutch means for opening said valve.

7. In a concrete mixer having a mixing drum, a loader bucket, a power operated shaft for operating the bucket and a clutch means controlling the same, a tank for receiving water, a water supply conductor for the same, a conductor for removing water from said tank and conveying the same to the mixing drum, a valve for the water supply conductor and a float for actuating the valve to close the water supply, a tappet connected with the clutch control means for operating said supply valve, and means actuated by the loader bucket for actuating the clutch control means and the tappet.

8. In a concrete mixer, a tank for supplying water thereto, a conductor for removing water from the tank and conveying the same to the mixer, said conductor including a movable part adapted to be depressed into the water of the tank and automatically establish a flow of the water into the conductor, a water supply means for the tank, a valve in said supply means and a float to close said valve, a supplemental chamber in which said float operates, said chamber having a drain port and a valve for opening and closing said port.

9. In a concrete mixer having a mixing drum, a loader bucket, a power operated means for operating the bucket, means for intermittently supplying a predetermined uniform quantity of water to the mixing drum consisting of a tank, a water supply conductor therefor, a conductor for removing water from said tank including a movable part within the tank having its inlet normally held above the maintained normal level of water in the tank, means operated with the operation of the power shaft for depressing said movable part of the conductor to discharge to the mixing drum the predetermined quantity of water from the tank, and means for restoring water to the tank in an amount substantially equal to that discharged, said means actuated by the lowering of the level of the water in said tank due to said discharge.

10. In a concrete mixer having a mixing drum, a loader bucket, a power operated means for operating the bucket, means for intermittently supplying a predetermined uniform quantity of water to the mixing drum consisting of a tank, a water supply conductor therefor, a conductor for removing water from said tank including a movable part within the tank having its inlet normally held above the maintained normal level of water in the tank, means operated with the operation of the power shaft for depressing said movable part of the conductor to discharge to the mixing drum the predetermined quantity of water from the tank, and a float controlled valve in the supply conductor for restoring water to the tank in an amount substantially equal to that discharged, said float controlled valve actuated by the lowering of the level of the water in said tank due to said discharge.

GEBHARD JAEGER.